United States Patent
Klefter et al.

(10) Patent No.: US 8,879,522 B2
(45) Date of Patent: Nov. 4, 2014

(54) METHOD, APPARATUS AND SYSTEM FOR MOBILITY MANAGEMENT AND EFFICIENT INFORMATION RETRIEVAL IN A COMMUNICATIONS NETWORK

(75) Inventors: Marc Klefter, Malmo (SE); Ulf Ahlfors, Barseback (SE)

(73) Assignee: Mashmobile Sweden AB, Lund (SE)

( * ) Notice: Subject to any disclaimer, the term of this patent is extended or adjusted under 35 U.S.C. 154(b) by 716 days.

(21) Appl. No.: 12/666,387

(22) PCT Filed: Jul. 4, 2008

(86) PCT No.: PCT/EP2008/058686
§ 371 (c)(1),
(2), (4) Date: Feb. 22, 2010

(87) PCT Pub. No.: WO2009/004083
PCT Pub. Date: Jan. 8, 2009

(65) Prior Publication Data
US 2010/0177699 A1 Jul. 15, 2010

Related U.S. Application Data

(60) Provisional application No. 60/993,192, filed on Sep. 10, 2007.

(30) Foreign Application Priority Data

Jul. 5, 2007 (EP) .................... 07111884

(51) Int. Cl.
| | | |
|---|---|---|
| H04W 4/00 | (2009.01) | |
| H04W 60/00 | (2009.01) | |
| H04L 12/701 | (2013.01) | |
| H04L 29/12 | (2006.01) | |
| H04W 80/04 | (2009.01) | |
| H04W 8/02 | (2009.01) | |

(52) U.S. Cl.
CPC ......... *H04L 29/12132* (2013.01); *H04W 60/00* (2013.01); *H04L 45/00* (2013.01); *H04W 80/04* (2013.01); *H04L 61/1552* (2013.01); *H04W 8/02* (2013.01)

USPC ............................. 370/338; 370/352

(58) Field of Classification Search
None
See application file for complete search history.

(56) References Cited

U.S. PATENT DOCUMENTS 6,275,492 B1 8/2001 Zhang
6,654,359 B1 11/2003 La Porta et al.
(Continued)

FOREIGN PATENT DOCUMENTS

EP 1 158 740 A1 11/2001
EP 1 519 538 A2 3/2005
(Continued)

OTHER PUBLICATIONS

"Mobile Web Server, Raccoon, project:" http://opensource.nokia.com/projects/mobile-web-server/, verified: May 1, 2007 Now available on. http://wiki.opensource.nokia.com/projects/Mobile Web Server.

(Continued)

*Primary Examiner* — Mohammad Adhami
(74) *Attorney, Agent, or Firm* — Dentons US LLP

(57) ABSTRACT

A method and apparatus of forming a generic overlay network for efficient information retrieval in a communications network, comprising receiving in a domain router a register request from a mobile communications apparatus, the register request including an identification of said mobile communications apparatus; looking-up an address to a next-hop router associated with the identification; sending the register request to the next-hop router; receiving a reply from the next-hop router; and if the reply includes an address to a home router, sending a reply to the mobile communications apparatus including the address of the home router, said reply initiating the establishment of a connection between the mobile communications apparatus and the home router.

15 Claims, 14 Drawing Sheets

(56) References Cited

U.S. PATENT DOCUMENTS

| | | | |
|---|---|---|---|
| 7,076,552 | B2 | 7/2006 | Mandato |
| 7,136,389 | B2 | 11/2006 | Shahrier et al. |
| 7,203,733 | B1 | 4/2007 | Bern |
| 7,239,618 | B1 | 7/2007 | La Porta et al. |
| 7,352,731 | B1 | 4/2008 | Leung |
| 2002/0069278 | A1 | 6/2002 | Forslow |
| 2003/0145038 | A1* | 7/2003 | Bin Tariq et al. ............ 709/202 |
| 2003/0162499 | A1 | 8/2003 | Jonsson |
| 2005/0025161 | A1* | 2/2005 | Spooner ........................ 370/401 |
| 2005/0250496 | A1 | 11/2005 | Hason |
| 2006/0059264 | A1* | 3/2006 | Leung et al. .................. 709/227 |
| 2006/0087999 | A1 | 4/2006 | Gustave et al. |
| 2007/0258389 | A1 | 11/2007 | Suzuki et al. |
| 2009/0017800 | A1* | 1/2009 | Middleton ................. 455/414.1 |
| 2009/0175265 | A1* | 7/2009 | Lindgren ..................... 370/352 |
| 2010/0075636 | A1* | 3/2010 | Bajko et al. .................. 455/411 |

FOREIGN PATENT DOCUMENTS

| | | |
|---|---|---|
| JP | 2004/007578 | 1/2004 |
| JP | 2006/332833 | 7/2006 |
| WO | 2003/081876 A1 | 10/2003 |
| WO | WO 2005/041534 A1 | 5/2005 |
| WO | WO 2005/086458 A1 | 9/2005 |
| WO | 2005/125148 A1 | 12/2005 |

OTHER PUBLICATIONS

"Performance Evaluation of the Mobile Peer-to-Peer Service" by Ingo Gruber, 2004.

Enabling Mobile Peer-to-Peer Networking: by Jens O. Oberender, et al., 2000.

"JXME project", http://jxme.jxta.org/, verified: May 1, 2007, Now available on: https://jxta-jxme.dev.java.net/.

First Office Action, State Intellectual Property Office of the People's Republic of China, Patent Application No. 200880103105.2, Apr. 18, 2012, 4 pages.

Text of the First Office Action, State Intellectual Property Office of the People's Republic of China, Patent Application No. 200880103105.2, Apr. 18, 2012, 14 pages.

Notice of Reasons for Rejection from the Japanese Patent Office, Japanese Patent Application No. 2010-514003, Mar. 13, 2012, 2 pages.

International Search Report, corresponding to PCT/EP2008/058686, mailed Sep. 26, 2008.

Written Opinion, corresponding to PCT/2008/058686, mailed Sep. 26, 2008.

International Preliminary Report on Patentability, corresponding to PCT/EP2008/058686,completion of report Oct. 6, 2009.

Alex C. Snoeren and Hari Balakrishnan, MIT Laboratory for Computer Science Cambridge, MA 02139, 6th ACM/IEEE International Conference on Mobile Computing and Networking (MobiCom '00); An End-To-End Approach to Host Mobility, 2000.

William Adjie-Winoto, Elliot Schwartz, Hari Balakrishnan, and Jeremy Lilley; M.I.T. Laboratory for Computer Science; 17th ACM Symposium on Operating System Principles (SOSP '99); Published an *Operating Systems Review*, 34(5): 186-201, Dec. 1999; The Design and Implementation of an Intentional Naming System.

IP Mobility Support for IPv4, IETF RFC 3344, C. Perkins, Ed., Aug. 2002.

Mobility Support IPv6, IETF RDC 3775, D. Johnson et al., Jun. 2004.

* cited by examiner

DR 103 routing table (111.11.1.1)

| URI | Next hop primary address | Next hop secondary address | timer |
|---|---|---|---|
| alice.example.com | 123.456.78.9 | 123.456.87.1 | #T# |
| bob.example.com | 234.567.89.2 | 345.678.91.2 | #T# |

FIG. 11

FR 105 routing table (234.567.89.2) of FIG. 10

| URI | Next hop primary address | Next hop secondary address | Previous hop primary address | Previous hop secondary address | timer | direct |
|---|---|---|---|---|---|---|
| bob.example.com | 98.87.76.65 | 45.678.91.9 | 111.11.1.1 | 345.678.91.2 | #T# | no |

FIG. 12

FR 105 routing table (234.567.89.2) of FIG. 13

| URI | Next hop primary address | Next hop secondary address | Previous hop primary address | Previous hop secondary address | timer | direct |
|---|---|---|---|---|---|---|
| bob.example.com | 45.678.91.9 | 98.87.76.65 | 111.11.1.1 | 345.678.91.2 | #T# | no |

FIG. 14

METHOD, APPARATUS AND SYSTEM FOR MOBILITY MANAGEMENT AND EFFICIENT INFORMATION RETRIEVAL IN A COMMUNICATIONS NETWORK

TECHNICAL FIELD

The present invention relates to the field of information retrieval in a communications network, and more particularly to method and apparatus of forming a generic overlay network for efficient information retrieval in a communications network.

BACKGROUND

The peer-to-peer model of communication implies that any node can act as a server for any other node. Resources are located by having the requesting node entering a resource query into the peer-to-peer network. How and by which protocol the requested resource is located depends on the search paradigm being employed in the peer-to-peer network; either by query flooding as in unstructured peer-to-peer networks, or by some distributed lookup mechanism as in structured peer-to-peer networks. The common assumption, however, is that all nodes, including the requesting node, the lookup nodes, and the target node(s), are all part of the peer-to-peer network. This assumption limits the use and makes the service more restrictive than the prevailing Internet model, where it is assumed that any registered server may be looked up through the public DNS system. The DNS system, however, assumes that a server has a stable IP address. Due to the way the current DNS system works, with distributed name servers and caching principles, address changes cannot take place too often, as this may lead to a server becoming unreachable during periods of change.

Dynamic DNS (DDNS) is an extension to the DNS system. DDNS allows the domain name data held in a name server to be updated in real time, thus allowing an Internet domain name to be assigned to a computer (server) with a varying (i.e., dynamic) IP address. The service usually involves a DDNS provider who is in control of the DNS registration and renewal process. The user updates the DDNS provider's DNS servers with the most current IP address of the server whenever a change is detected. The disadvantages with this solution includes the involvement of a DDNS provider and the potential long response times before an update takes full effect throughout the world-wide DNS system, during which the target server is unreachable. Furthermore, the method does not overcome the problem when hosts are located behind a Network Address Translator (NAT) and thus are assigned IP addresses from private (globally, non-routable) address realms.

Since the DNS and DDNS systems alone cannot give sufficient support for Internet host mobility, a number of methods and technologies have been proposed. Two approaches called network-layer mobility and higher-layer mobility exist in the prior art.

IP Mobility Support for IPv4", IETF RFC 3344, C. Perkins, Ed., August 2002 and Mobility Support in IPv6", IETF RFC 3775, D. Johnson et. al., June 2004 disclose the current IETF standard for network-layer mobility. Mobile IP makes it possible for a mobile user (mobile node or host) to maintain a single address while making transitions between networks and network media. Each mobile node is always identified by its home address, irrespective of its current point of attachment to the Internet, allowing for transparent addressing with respect to the network and all other devices. The only devices, which need to be aware of the movement of this node, are the mobile device and the home router acting on behalf of the mobile device. This approach relies on support in the IP substrate of the networks involved, which is not always the case. To support NAT traversal, additional message extensions of the Mobile IP protocol are required (IP-in-UDP encapsulation). Moreover, as Mobile IP is a routing solution with the objective to act transparently to higher layers of the Internet Protocol stack, it does not give any support for efficient transport of application data, which may become critical in mobile environments.

An application level end-to-end host mobility architecture is disclosed in "An End-to-End Approach to Host Mobility", A. C. Snoeren and H. Balakrishnan, Proc. of the Sixth Annual ACM/IEEE International Conference on Mobile Computing and Networking, Boston, Mass., August 2000. It uses secure updates to the DNS system upon address change, and a set of connection migration options to manage changes in the IP address of a host without breaking the end-to-end connection. The approach is truly end-to-end in that no intermediate nodes are directly involved in the mobility support. As a consequence, the infrastructure itself does not offer efficient transport depending on end-host capabilities. Moreover, while the approach addresses connection migration across NATs, it gives no explicit support for reaching mobile servers behind NATs.

The prior art document "The design and implementation of an intentional naming system", W. Adjie-Winoto et. al, 17th ACM Symposium on Operating Systems Principles, Charleston, S.C., December 1999, discloses a resource discovery and service location system for dynamic and mobile networks of devices and computers called Intentional Naming System (INS). INS uses a separate language based on attributes and values for its names and implements a late binding mechanism that integrates name resolution and message routing, enabling clients to continue communicating with end-nodes even if the name-to-address mappings change while a session is in progress. The INS architecture thus requires specific name resolvers in order to form an application-level overlay network.

One approach to cope with mobile networks and MANETs (mobile ad-hoc networks) is to apply cross-layer optimization to make the peer-to-peer overlay routing structure aware of the transient nature of the underlying network. This is the approach taken in the Mobile Peer-to-peer protocol disclosed in "Performance Evaluation of the Mobile Peer-to-Peer Protocol", I. Gruber, R. Schollmeier, and W. Kellerer, Fourth International Workshop on Global and Peer-to-Peer Computing (GP2PC'2004), 2004; and "Mobile Peer-to-Peer Networking", W. Kellerer, R. Schollmeier, I. Gruber, and F. Niethammer, patent WO2005041534, 2004. According to this approach cross layer communication is used to interlink the routing layer with the underlying physical layer. This approach assumes communication across layers, thus making deployment an issue.

The issue with peer-to-peer networking access to resource constrained mobile devices are addressed by means of offloading the mobile devices either by caching contents in the wired parts of the network, as disclosed in e.g. "Enabling mobile peer-to-peer networking", J. Oberender et al, Mobile and Wireless Systems, LNCS 3427, Germany (2005); connecting the devices to dedicated gateways, as disclosed in e.g., "Mobile Web Server, Raccoon, project", http://opensource.nokia.com/projects/mobile-web-server/, verified: 2007-05-01; or minimizing the signaling overhead by modifying the access protocol, as disclosed in e.g., "JXME project", http://jxme.jxta.org/, verified: 2007-05-01. These approaches restrict the true end-to-end paradigm of the Internet.

SUMMARY

It is an object of the invention to eliminate or alleviate at least some of the above disadvantages and to provide an improved method, apparatus and system for mobility management and efficient information retrieval in a communication network.

The present invention provides a protocol stack for efficient and scalable peer-to-peer model of communication in dynamic and mobile networks of devices and computers where nodes form a generic overlay network and are allowed to be mobile and move independently of the underlying network infrastructure.

One aspect of the present invention is a method of forming a generic overlay network for efficient information retrieval in a communications network. The method comprise:

receiving in a domain router a register request from a mobile communications apparatus, the register request including an identification of said mobile communications apparatus;

looking-up an address to a next-hop router associated with the identification;

sending the register request to the next-hop router;

receiving a reply from the next-hop router; and if the reply includes an address to a home router, sending a reply to the mobile communications apparatus including the address of the home router, said reply initiating the establishment of a connection between the mobile communications apparatus and the home router.

A second aspect of the invention is a domain router for forming a generic overlay network for efficient information retrieval in a communications network. The domain router comprises:

a receiver adapted to receive a register request from a mobile communications apparatus, the register request including an identification of said mobile communications apparatus;

a controller adapted look-up an address to a next-hop router associated with the identification, a transmitter adapted to send the register request to the next-hop router;

wherein, the receiver is adapted to receive a reply from the next-hop router; the controller is adapted to determine if the reply includes a network address to a home router; and the transmitter is adapted to send a reply message to the mobile communications apparatus including the address of the home router, said reply message initiating the establishment of a connection between the mobile communications apparatus and the home router.

A third aspect of the present invention is an alternative method of forming a generic overlay network for efficient information retrieval in a communications network. The method comprises:

receiving in a home router a register request for a mobile communications apparatus from a domain router, the register request including an identification of said mobile communications apparatus;

in response to the register request, generating a reply including the home router address; and sending the reply to the domain router to initiate a forward reply to the mobile communications apparatus including the address of the home router.

A fourth aspect of the present invention is a home router for forming a generic overlay network for efficient information retrieval in a communications network. The home router comprises:

a receiver adapted to receive a register request for a mobile communications apparatus from a domain router, the register request including an identification of said mobile communications apparatus;

a controller adapted to, in response to the register request, generating a reply including the home router address; and a transmitter adapted to send the reply to the domain router to initiate a forward reply to the mobile communications apparatus including the address of the home router.

A fifth aspect of the present invention is another alternative method of forming a generic overlay network for efficient information retrieval in a communications network. The method comprises:

requesting a connection to a home router by sending an inquiry to a domain name server;

receiving an address to a domain router connected to the home router;

requesting to register at the home router by sending a register request to the domain router of the received address;

receiving a register reply from the domain router with reference to the home router;

generating and sending a register request directly to the home router; and establishing a connection between the home router and the mobile communications apparatus.

A sixth aspect of the present invention is a computer program comprising computer program code means adapted to perform all the steps of the methods according to the different aspects of the present invention outlined above, when said program is run on a computer.

In one or more embodiments the computer program of the sixth aspect is embodied on a computer readable medium.

In one or more embodiments the computer program of the sixth aspect is a computer program on a carrier and comprising computer executable instructions for causing a computer to perform the methods according to the different aspects of the present invention outlined above, when said program is run on a computer.

In one or more embodiments of the computer program the carrier is a record medium, computer memory, read-only memory or an electrical carrier signal.

A seventh aspect of the present invention is a computer program product comprising a computer readable medium, having thereon: computer program code means, when said program is loaded, to make the computer execute the process of any of the methods according to the different aspects of the present invention outlined above.

BRIEF DESCRIPTION OF THE DRAWINGS

Objects, features and advantages of embodiments of the invention will appear from the following detailed description, reference being made to the accompanying drawings, in which:

FIG. 11 shows the routing table of the domain router as in FIG. 10;

FIG. 12 shows the routing table of a foreign router as in FIG. 10;

FIG. 14 shows the updated routing table of an FR according to FIG. 13; and

DETAILED DESCRIPTION

Figure 1:
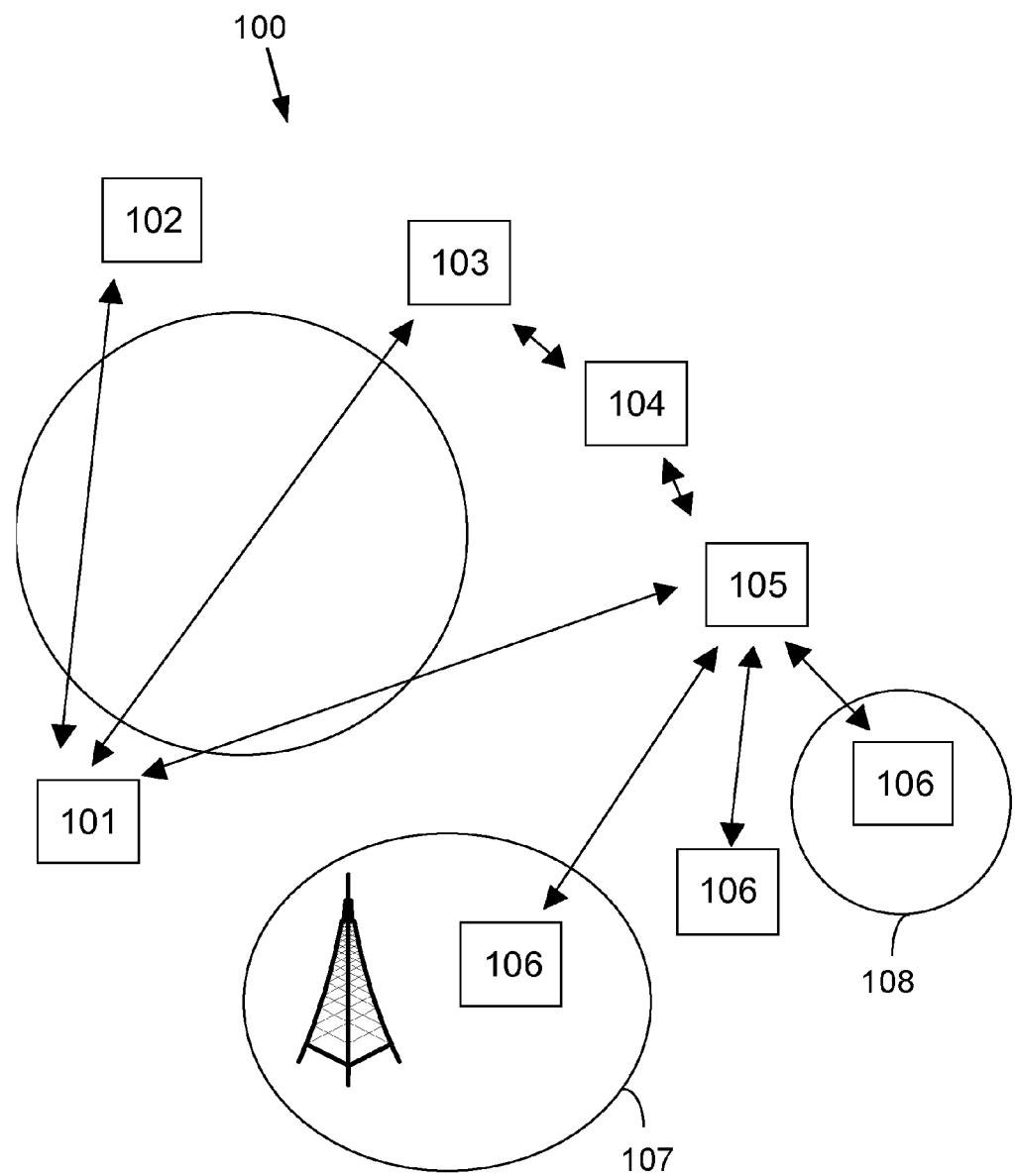
FIG. 1 illustrates an example of a network infrastructure with a set of entities, one or more forming a generic overlay network.

FIG. 1 illustrates an example of a network infrastructure 100 with a set of entities, one or more forming a generic overlay network. The entities may include one or more clients 101, and Domain Name Servers (DNSs) 102, Domain Routers (DRs) 103, Home Routers (HRs) 104, Foreign Routers (FRs) 105, and Mobile server Nodes (MN) 106.

The clients 101 may be conventional hosts (not necessarily part of the overlay network) with access to the global Internet 107. Any properly equipped client can access applications hosted on any MN 106. Similarly, a MN 106 may act as a client in other situations. The network entities that are part of the overlay network may be one or more DRs 103, HRs 104, FRs 105, and MNs 106. The number and type of entities of the network infrastructure and the overlay network in FIG. 1 is only an example and is not intended to limit the scope of the invention.

The Domain Router, DR 103, is an entity adapted to look up and re-direct requests for a certain Uniform Resource Identifier (URI) or logical name towards a point of attachment, i.e. an HR or FR, for an MN associated with the requested URI. The look up is performed by interacting with other nodes in the overlay network, including one or more Domain Name Servers (DNSs) 102, Domain Routers (DRs) 103, Home Routers (HRs) 104, Foreign Routers (FRs) 105, and Mobile server Nodes (MN) 106 or a combination thereof.

Each DR 103 contains a next-hop routing table where each row contains <URI, {next-hop routers}, timer>. Hence, the table contains an ordered list of next-hop entries of addresses of HRs or FRs for each registered URI, and the timer for a certain URI row is renewed for each look-up query towards that URI. An URI row is removed from the table when the timer runs out. The DR 103 maintains connections with all HRs/FRs in its next-hop routing table. The connection may be via TCP or any suitable transport layer protocol. Moreover, the DR 103 may be configured in a cluster topology for performance and/or redundancy reasons. Each name domain is controlled by one DR entity or possibly a cluster thereof. Furthermore, the DR 103 maintains a table of the addresses to clients with currently outstanding, non-answered look-up queries for an URI in the domain controlled by the DR 103. Upon receiving the first query response for a certain URI from a next-hop HR/FR, the DR 103 will reply to all clients with currently outstanding queries, thus optimizing the look-up delay experienced by the clients.

The Home Router, HR 104, is an entity adapted to look up and re-direct requests for a certain URI or logical name towards the point of attachment (HR or FR) for the MN associated with the requested URI. The look up is performed by interacting with other nodes in the overlay network. Each HR 104 contains a routing table where each row contains <URI, {next-hop routers}, {previous-hop routers}, timer, direct>. For each registered URI, the table contains an ordered list of next-hop entries of addresses of HRs or FRs, an ordered list of previous-hop entries of addresses of DRs, HRs or FRs, a timer that is renewed for each look-up query towards that URI, and a direct flag that indicates if the MN associated with the URI is directly connected with the HR 104. In this case the HR 104 replies with its own address for any look-up requests targeting the MN. An URI row is removed from the table when the timer runs out. The HR 104 maintains connections, which may be via TCP or any suitable transport layer protocol, with all HRs/FRs in its routing table. If directly connected to any MN (one or more), the HR 104 is responsible for maintaining a direct connection, via TCP or any suitable transport layer protocol, with that MN—possibly through NATs and Firewalls—and acts as a relay node for application traffic between the MN and other nodes. A new MN typically registers, possibly upon an explicit invite, its URI with an HR to enter the overlay network. Only one HR 104 can be the original HR for an MN at any given time, while an MN may maintain associations with other HRs.

The Foreign Router, FR 105, is an entity adapted to look up and re-direct requests for a certain URI or logical name towards the point of attachment (HR or FR) for the MN associated with the requested URI. The look up is performed by interacting with other nodes in the overlay network. Each FR 105 contains a routing table where each row contains <URI, {next-hop routers}, {previous-hop routers}, timer, direct>. For each registered URI, the table contains an ordered list of next-hop entries of addresses of HRs or FRs, an ordered list of previous-hop entries of addresses of DRs, HRs or FRs, a timer that is renewed for each look-up query towards that URI, and a direct flag that indicates if the MN holding the URI is directly connected with the FR 105. In this case the FR 105 replies with its own address for any look-up requests targeting the MN. An URI row is removed from the table when the timer runs out. The FR 105 maintains connections, which may be via TCP or any suitable transport layer protocol, with all HRs/FRs in its routing table. If directly connected to any MN (one or more), the FR 105 is responsible for maintaining a direct connection, via TCP or any suitable transport layer protocol, with that MN—possibly through NATs and Firewalls—and acts as a relay node for application traffic between the MN and other nodes. A node acting as FR to one MN may act as HR to other MNs.

The Mobile Node, MN 106, is a host that may change its location from one network or subnet to another and change its IP address. It may continue to communicate with and be reached by other Internet nodes at any location, assuming link-layer connectivity and an assigned and valid IP address. The MN 106 may be provided in an electronic apparatus, which may be embodied as a mobile terminal for a telecommunications system or mobile network 107, for example GSM, UMTS or any other system or network, such as a WLAN 108.

Any combination of the above entities 101-106 and 108 may be co-located in a single device (possibly multi-homed), or they may all be installed on separate devices. For the remaining of this discussion, we may regard and will denote these logical entities as separate units of software running on individual devices with computer and network connection and communications capabilities.

Figure 2:
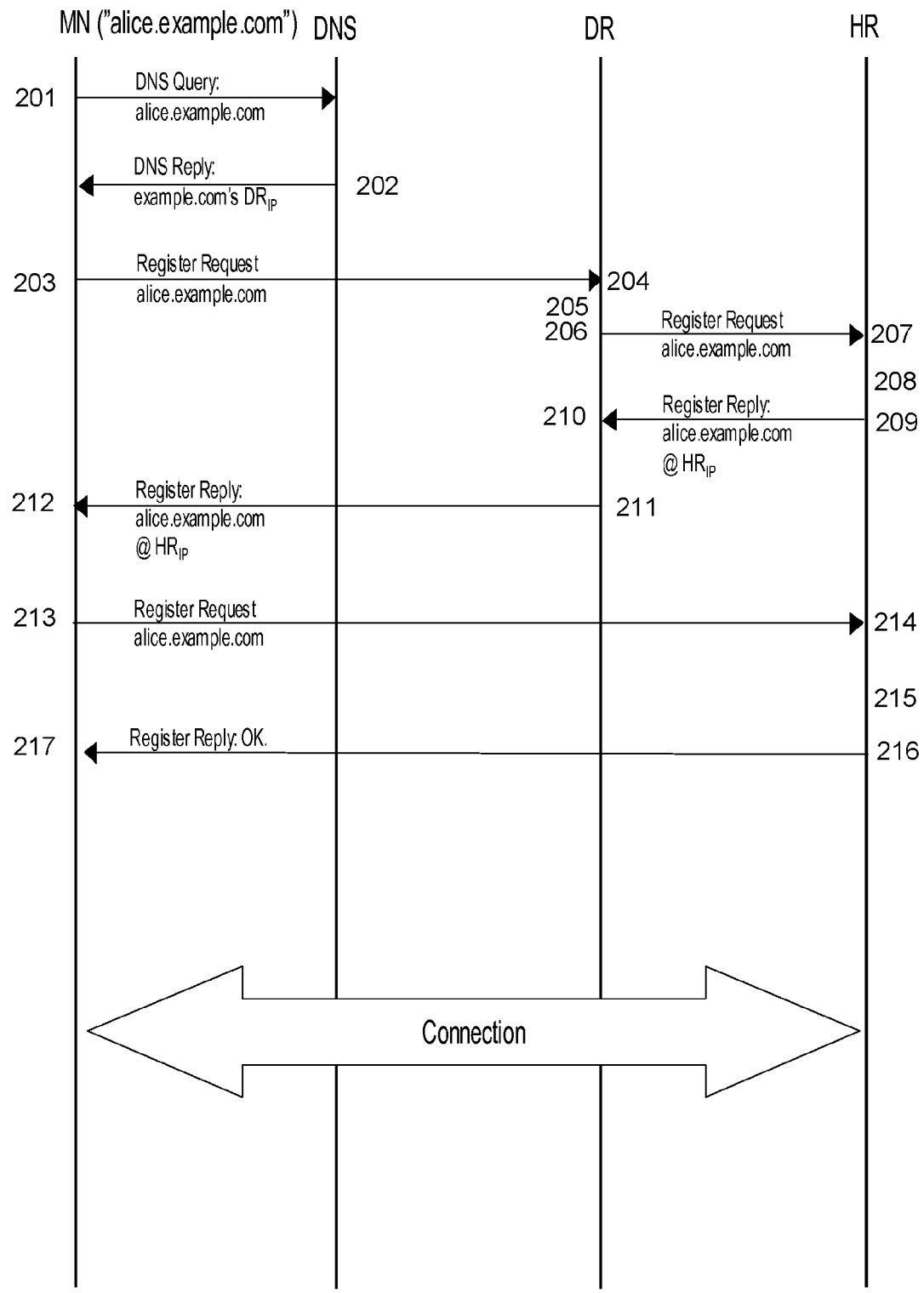
FIG. 2 is a schematic diagram according to one embodiment of a method of registering a mobile communications apparatus as a mobile server node and establishing a connection with a home router in the overlay network of an electronic communications network as in FIG. 1.

FIG. 2 illustrates a method of registering a mobile communications apparatus as a mobile server node MN 106 and establishing a connection with the home router HR 104 in the overlay network of an electronic communications network as in FIG. 1. In addition to the necessary network connectivity conditions and having a valid IP address, the MN 106 must have proper overlay functionality installed. This functionality may be a computer program product comprising a computer readable medium, having thereon computer program code means, when said program is loaded, to make the computer execute the process to provide the functionality.

According to the embodiment of FIG. 2, the MN 106 is initially unaware of the actual address of its HR 104. In this case the bootstrapping is realized by having the MN 106 resolving its name through the DNS 102 by sending a DNS Query in step 201. The DNS finds and returns an address of the responsible DR by sending a DNS Reply in step 202, towards which the MN can direct a Register Request in step 203.

According to one embodiment the DR receives a Register Request in step 204 and performs a look-up based on the name in step 205. If a valid HR is identified, the DR sends the Register Request to the identified HR in step 206. The HR receives the Register Request from the DR in step 207 and processes the Register Request in step 208. The HR replies by sending a Register Reply to the requesting DR in step 209. The DR receives the Register Reply from the HR in step 210. The DR proceeds by returning a reply message towards the MN stating the HR's IP address, for example alice.example.com@$HR_{IP}$ in step 211. The MN receives the Register Reply from the DR in step 212 and may then send a Register Request directly to the identified HR by using the received IP address in step 213. When the HR receives the Register Request directly from the requesting MN in step 214, it verifies the received Register Request in step 215. In step 216 the HR sends a Register Reply which is received by the MN in step 217, representing an acknowledgement that a direct connection has been successfully established between the MN and the HR. Upon completing the shown sequence of events, the MN 106 may be addressable by other hosts being attached to the Internet as will be further illustrated below.

As described above, a HR must be identified to which an MN may be registered. However, in the case when no valid HR is known in the DR, rules may be defined for an appropriate response. Actions include replying with a suitable error message, or referring to alternative HRs, provided that one or more alternative HRs have been defined. The MN contacts the HR and a direct connection is established. This connection is monitored, maintained and repaired by both entities by for example keep-alive messages or similar until the MN deregisters or terminates.

The MN may be initially unaware of the actual address of its HR as in the embodiment of the method as described above or the MN may know the address of the HR.

In the latter case the HR's IP address may be known in advance, by means of being cached from previous sessions, preconfigured or communicated in a separate invitation. In this case when the MN already is aware of the address to "its" HR the MN may contact and register with the HR directly.

The invention is not limited by the embodiment of the method of registering a mobile communications apparatus with a home router HR in an overlay network as described above. In a more general embodiment of the invention, the initial bootstrapping and subsequent re-registration process will be any combination of the following steps:

1. The MN performs local discovery ("neighbour solicitation") by means of broadcast (or multicast on dedicated addresses) in the current subnet. It may result in direct replies from HR/FR nodes present in the subnet. Alternatively, it may result in indirect references to potential HR/FR nodes by means of received hints carried in replies from other MNs present in the subnet (i.e., MNs acting as solicitation relay agents). In case of multiple alternatives, the MN will have to choose an anchor point based on configurable criteria.

2. The MN resolves the address to its DR and contacts it for referral to a suitable HR or FR. The DR may base its response on various criteria, like network proximity (number of hops, ping/trace-route latency, overlapping routes, etc.), geographical location (e.g., based on GPS data), capacity and reported traffic measurements (e.g., current processing and load situation in nodes and links), or peering collaboration agreements set up based on communities and known interpersonal relationships or by other means. This process may or may not rely on input from other DRs and HR/FR nodes, and possibly from other special purpose servers in the overlay.

3. The MN contacts known HR/FR nodes cached from previous sessions or retrieved from any other repository, typically a website or similar, according to some predetermined ordering scheme.

Upon each registration with an HR/FR, the MN should state the address of the last connected HR/FR, if any. Based on this information, the new HR/FR contacts the last connected HR/FR for updating its next-hop path. If such an address cannot be given, the HR/FR will perform a name resolution process based on the name registered by the MN, eventually leading the new HR/FR to the MN's last known point of attachment, if any. Otherwise, the originating HR should be contacted directly.

An MN may change its point of attachment because of changes in the network topology, node failures, mobility: e.g., as the node moves around and detects better radio conditions, or according to any metadata condition, such as clustering with other nodes.

Figure 3A:
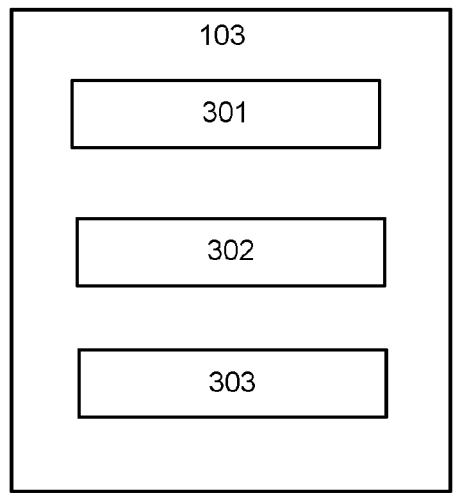
FIG. 3A is a block diagram of a domain router according to one embodiment.

FIG. 3A is a block diagram of a domain router 103 in a generic overlay network for efficient information retrieval in a communications network. The domain router 103 is configured to register a mobile communications apparatus 106 with a home router 104 in the communications network. According to one embodiment, the domain router 103 comprises a receiver 301 adapted to receive a register request from the mobile communications apparatus 106, wherein the register request includes an identification of the mobile communications apparatus. A controller 302 of the domain router is adapted to look-up an address to a next-hop router 104 or 105 associated with or to be associated with the identification, i.e. the requesting MN 106. Moreover, the domain router 103 has a transmitter 303 adapted to send the register request to the next-hop router 104 or 105.

The receiver 301 is further adapted to receive a reply from the next-hop router 104,105. The controller 302 is adapted to determine if the reply includes a network address to a home router 10; and the transmitter 303 is adapted to send a reply message to the mobile communications apparatus MN 106 including the address of the home router 104. The reply message initiates the establishment of a connection between the mobile communications apparatus and the home router when it is received and processed by the mobile communications apparatus.

Figure 3B:
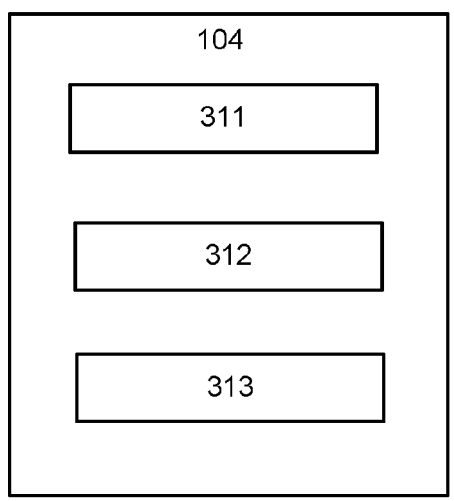
FIG. 3B is a block diagram of a home router according to one embodiment.

FIG. 3B is a block diagram of a home router 104 in a generic overlay network for efficient information retrieval in a communications network. According to one embodiment the home router 104 comprises a receiver 311, a controller 312, and a transmitter 313. The receiver 311 is adapted to receive a register request for a mobile communications apparatus 106 from a domain router 103, wherein the register request includes an identification of the mobile communications apparatus 106. The controller 312 is adapted to generate a reply including the home router address, in response to the register request. The transmitter 313 is adapted to send the reply to the domain router 103 to initiate a forward reply to the mobile communications apparatus 106 including the address of the home router.

In one embodiment, the receiver 311 is adapted to then receive a register request from the mobile communication apparatus 106. Furthermore, the controller 312 is adapted to, in response to the register request from the mobile communication apparatus 106, establish a connection between the home router 104 and the mobile communications apparatus 106.

Figure 3C:
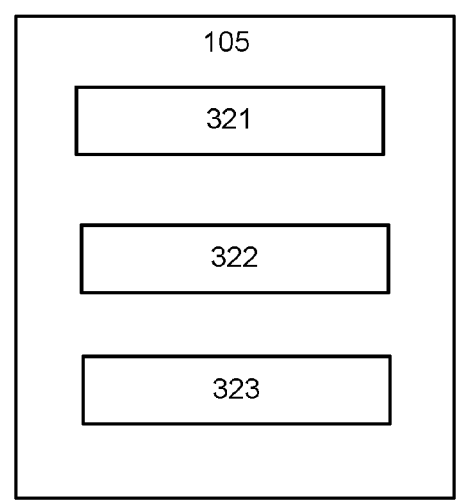
FIG. 3C is a block diagram of a foreign router according to one embodiment.

FIG. 3C is a block diagram of a foreign router 105 for forming a generic overlay network for efficient information retrieval in a communications network. According to one embodiment the foreign router 105 comprises a receiver 321, a controller 322, and a transmitter 323.

Figure 4:
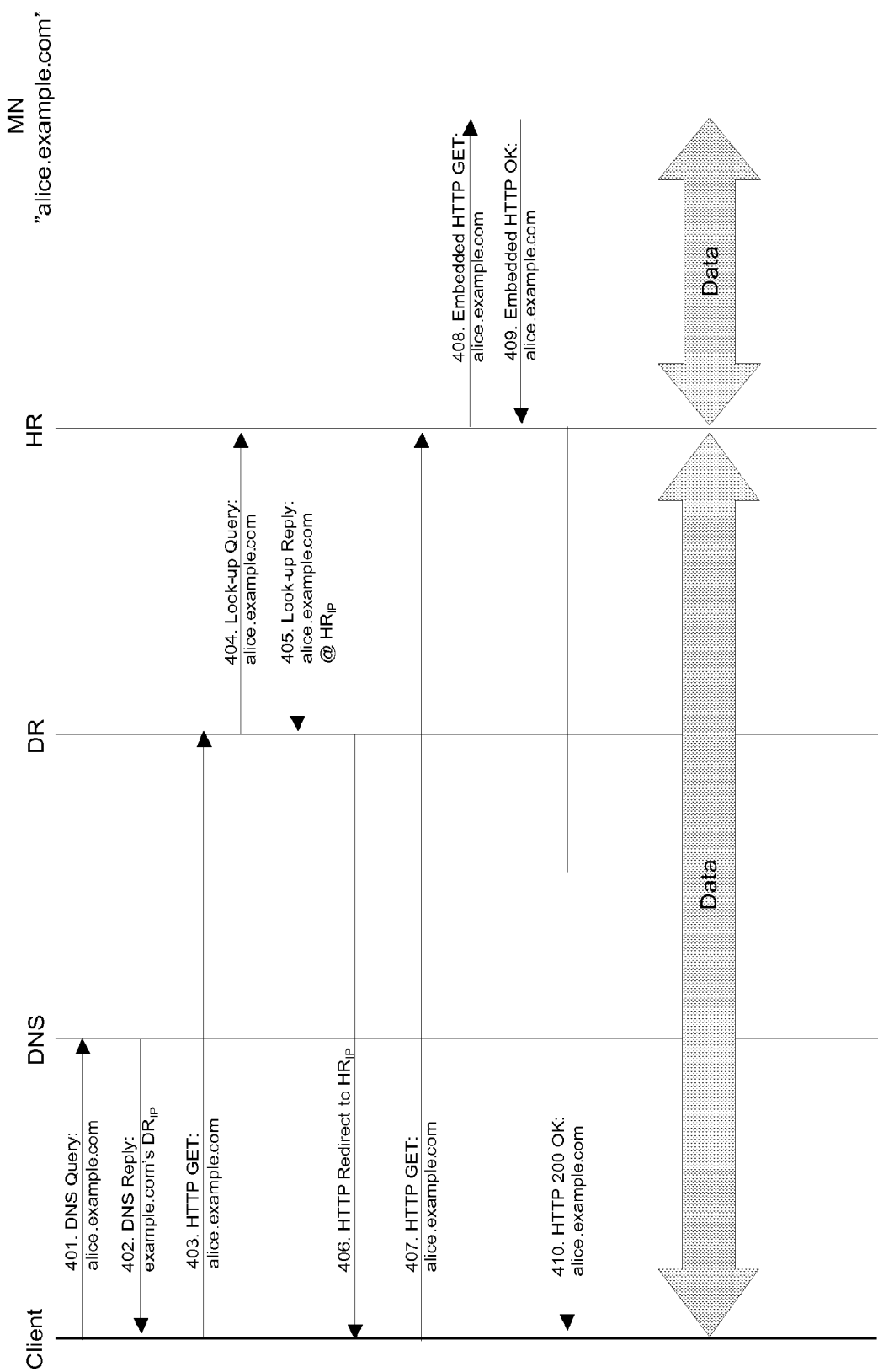
FIG. 4 is a schematic diagram of a method according to one embodiment when a client requests content from an MN.

FIG. 4 is a schematic flowchart of a method according to one embodiment when a client requests contents from an MN. The example illustrates a client requesting a web page (or similar) by issuing a HTTP GET. In step 401 the client sends a DNS Query with the web address "alice.example.com" to the DNS system. A DNS name server replies with the IP address of the DR for the "example.com" domain in step 402. Next, the client sends a HTTP GET with the "alice.example.com" address to IP address of the DR in step 403. In response to the received HTTP GET, the DR makes a look-up in step 404 in its next-hop routing table for a next-hop router to which the look-up query should be sent. The HR receiving the look-up query identifies the address of the requested MN as being directly connected and therefore sends a look-up reply with its own IP address in step 405. The HR identifies the HR of the requested MN by either selecting itself, if the HR is MN's original HR, or by interacting with other nodes, i.e. other HRs and/or FRs in the overlay network. In this example the direct flag indicates that the MN associated with the URI is directly connected with the HR 104. Thus, in this case the HR replies with its own address for the look-up request to the targeting the MN, i.e. "alice.example.com". In response to the look-up reply from the HR, the DR generates and sends a HTTP redirect message to the requesting client with the IP address of the HR connected to the requested MN in step 406. Hence the client may then send a HTTP GET foralice.example.com to the HR connected to the MN having the requested information in step 407. The HR generates and sends an embedded HTTP GET for alice.example.com to the MN in step 408 for accessing the requested information, i.e. the web page "alice.example.com" in this example. The MN replies with an embedded HTTP 200 OK to its HR in step 409. In response to the received embedded HTTP 200 OK, the HR generates and sends a HTTP 200 OK in step 410 for the requested web page to the requesting client, the user of which now may access the information on the requested web page.

In further embodiments, those skilled in the art will appreciate that the foregoing methods can be applied to alternative application protocols. As can be seen in this example, the final destination, i.e. the MN's address, is hidden from the client; the client will establish a TCP connection with the MN's HR (or FR in another scenario), while the HR (or FR) relays the messages between the client and the MN. It is assumed that this type of lookup only has to be performed for previously unknown clients, since most clients will be able to cache the address of the MN's HR (or FR) for future requests (indeed, this is a typical feature of today's web browsers). Furthermore, if the DR receives additional requests for a specific URI/name with at least one previously outstanding look-up, the DR may use the first returning look-up result to send a reply message to all of the requesting clients, thereby further optimizing the look-up delay experienced by the clients.

Figure 5:
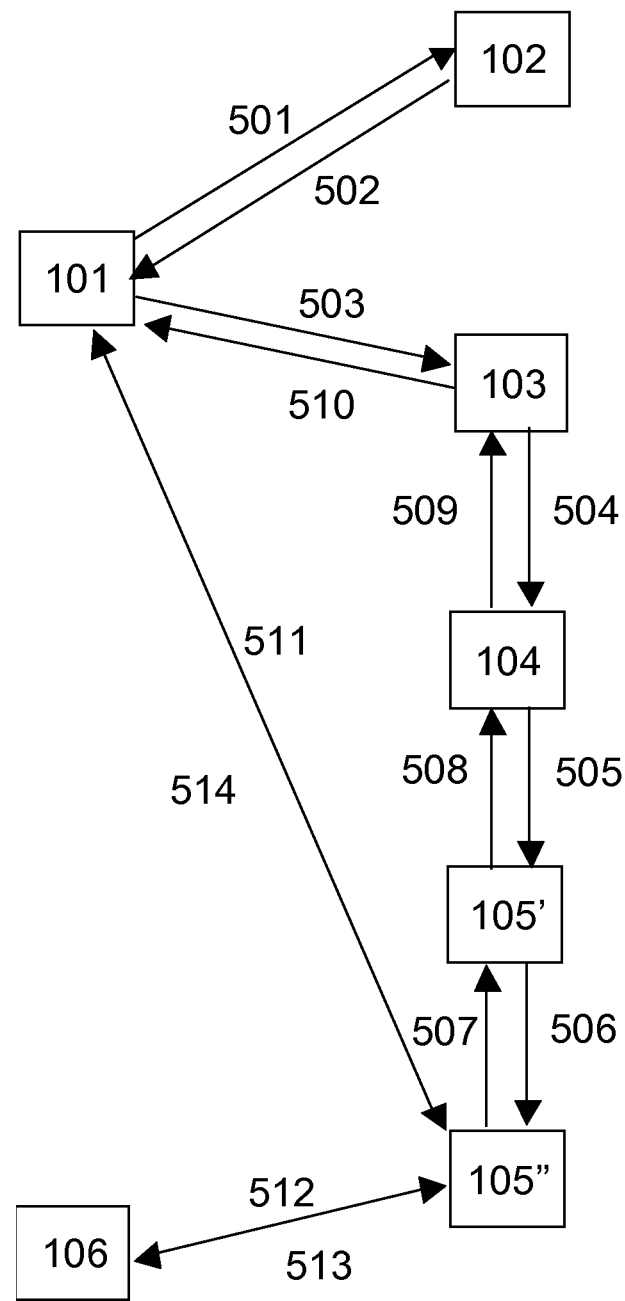
FIG. 5 is a schematic diagram of a method according to a second embodiment when a client requests content from an MN.

FIG. 5 is a schematic flowchart of a method according to a second embodiment when a client requests contents from an MN 106. In this example the MN 106 has moved to another subnet and registered anew according to the re-registration process outlined above. The same applies when the MN 106 has moved to another gateway or if the network topology has changed. The MN 106 has been registered with two alternative FRs 105a and 105b, one after the other. In the shown situation, the registration process has formed a "look-up chain" consisting of DR 103-HR 104-FR 105a-FR 105b, where the lowermost FR 105b is the MN's current point of attachment.

An MN may move, by performing a handover, to a new FR or back to its HR for reasons described above. The handover is controlled by the overlay in order to not disturb any ongoing application sessions. Upon a move, when the new point of attachment (HR/FR) contacts the last known point of attachment (HR/FR), any previous relationships will be detected by inspecting the next-hop routing tables. As a consequence, no loops will occur and the number of paths in the look-up path will be kept to a minimum. The details of this process will be described in detail below.

In FIG. 5, steps 501-504 of messaging equal steps 401-404 of messaging in FIG. 4. However, instead of being able to reply directly as in message 405 in FIG. 4, the HR 104 now has to propagate the query down the "look-up chain", i.e. step 505 and 506 via FR 105' and anchor FR 105" in FIG. 5. The anchor FR 105" returns a look-up reply in step 507 and the reply reaches the HR 104 in step 508 and the DR 103 in step 509, so that a redirect message can be returned to the client 101 in step 510. The client 101 then directs its request towards the anchor FR 105" in step 511, which in turn relays the request towards the MN 106 in step 512. Replies from the MN 106 goes via the anchor FR 105" directly to the client in step 513 and 514.

Figure 6:
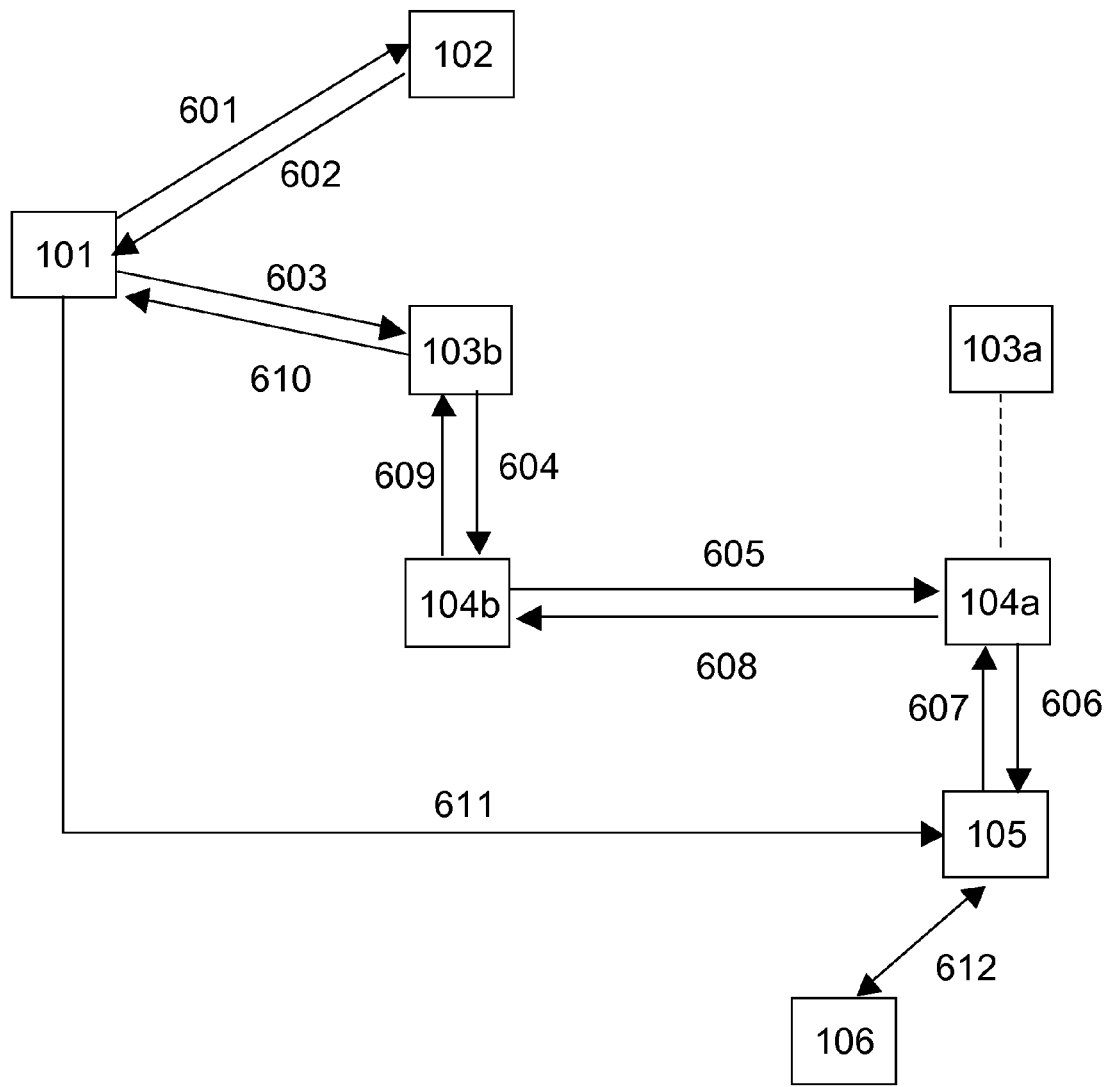
FIG. 6 is a schematic diagram of a method according to an embodiment when a client requests content from an MN that holds the resources associated with multiple URIs belonging to different domains.

FIG. 6 shows an MN 106 that has the resources associated with multiple URIs belonging to different domains, where each domain is controlled by separate DRs, DR 103a and 103b in this embodiment. The MN's 106 resources are accessible via a look-up request towards any URI through the proper DR 103b, where each request is directed to the proper DR 103b by conventional DNS look-up in steps 601 and 602. In the example shown, the request is made to a URI in the MN's 106 secondary domain. In this case the HRs 104a and FRs 105a in the primary domain act as FRs to the HR 104b in the secondary domain. Messages 601-612 are thus analogous to the messages 501-512 shown in FIG. 5.

The method and means to associate and address multiple URIs with an MN may as in FIG. 5 be realized by allowing HRs 104*a* in the primary domain to set up peering agreements between themselves and HRs 104*b* in the secondary domains. Such peering agreements can be established by means of explicit peering invites issued by one HR to another, or by having one HR requesting a peering relationship with another HR, possibly on demand. The peering connections may be pre-established or established upon request when an MN requests to establish a connection to the network.

Figure 7:
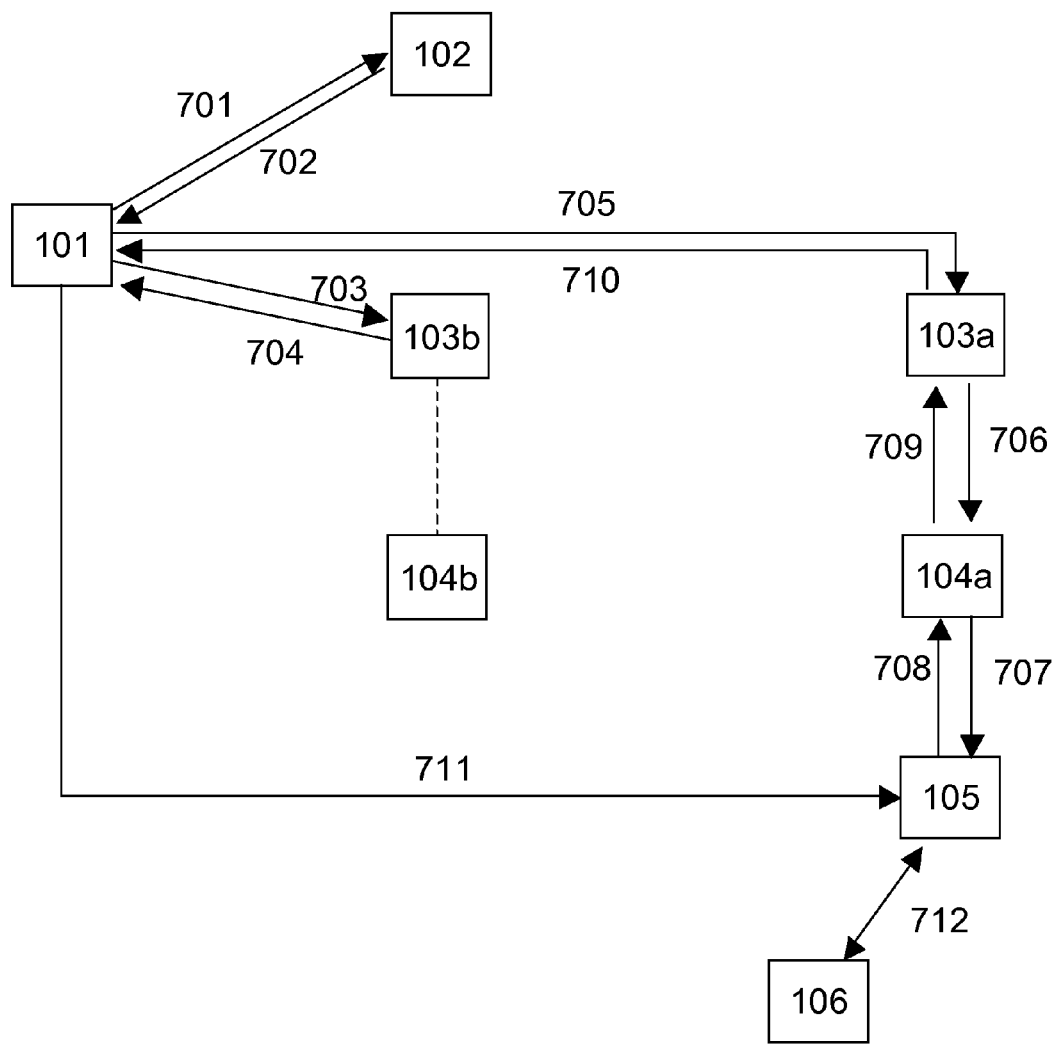
FIG. 7 is a schematic diagram of a method for peering according to one embodiment.

An alternative and complement to the HR peering method for host name aliasing described above is the DR alias mapping method. An example is shown in FIG. 7. In this case, the administrators of each secondary domain's DR 104*b* may register an association of the address of the primary domain's DR 104*a* with the name alias of an MN's 106 resources in their DR. In this way, any request for an MN's 106 alias is directed towards the secondary DR 103*b* in step 703 after a DNS look-up in steps 701 and 702, followed by a redirect response in step 704, pointing towards the primary domain's DR 103*a*, followed by a look-up request in step 705. Then, the previously outlined sequence of look-up requests in the primary domain is performed in step 706-709, and based upon the look-up response in step 710, direct contact is made by the requesting client towards the current FR 105 anchor node in step 711 which relays the request over the pre-established connection between the FR 105 and the MN 106 in step 712.

Figure 8:
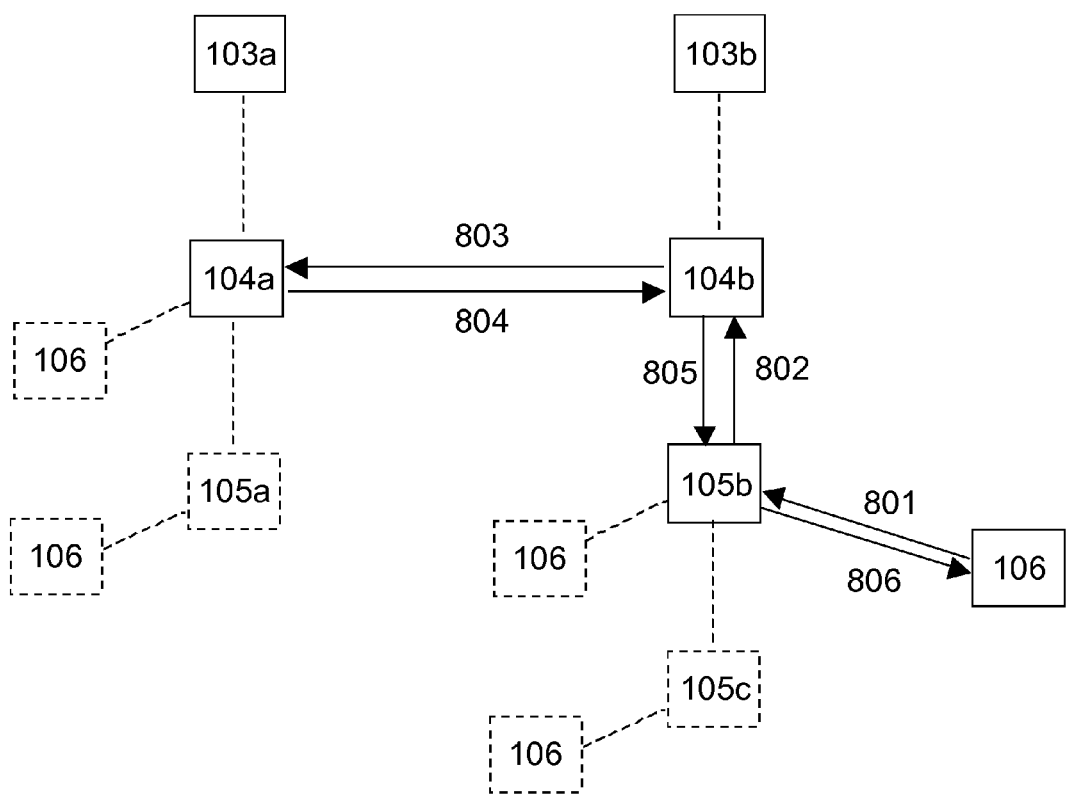
FIG. 8 is a schematic diagram of a method for peering according to a second embodiment.

HR peering may exist due to the host name aliasing described above, but it may also exist for other reasons, including for providing alternative access scenarios. Typical reasons for having alternative access scenarios include network proximity and clustering, or performance and redundancy reasons. This type of peering relationships typically occurs on-demand and they may be governed by some real-time criteria such as the current node location or other, more complex, metadata processing results. An embodiment of peering method is shown in FIG. 8. The two DRs 103*a* and 103*b* control two different domains, not necessarily related through a host name aliasing relationship. The MN 106 discovers a previously unknown FR 105*b* node using any of the methods for bootstrapping and registration described in connection with FIG. 2 above. After the discovery, MN 106 issues a request in step 801 for setting up a peering relationship between the two HRs 104*a* and 104*b*. The request contains as a parameter the address to MN's 106 HR 104*a*. The newly discovered FR 105*b* propagates the peering request in step 802 to all, or possibly a selected subset of the HRs, to which it is connected, either directly or indirectly (via other FRs)—in this case to HR 104*b*. Any HR receiving the request sends a peering request to MN's 106 HR 104*a* as in step 803. MN's 106 HR 104*a* replies with an OK or deny response in step 804, which in turn is propagated back to MN 106 in steps 805 and 806. The requested peering is established, resulting in the HR 104*a* to HR 104*b* and further to FR 105 connections.

As pointed out in this example embodiment, the newly discovered FR 105*b* may, if configured to do so, be able to filter out some or all of the peering requests instead of propagating them to its predecessor nodes (HRs or FRs) along the lookup chains of which the FR is a member. This means that such a peering request will not necessarily be forwarded on to an HR having the FR in its lookup chain. In a more general embodiment, any FR receiving a peering request of this kind may forward the request to any of its predecessor nodes (HRs or FRs) only if allowed to by its current filtering criteria. Typical filtering rules may include to forward only those requests made by nodes belonging to a certain domain. Another filter could be to direct requests to specific HRs depending on the affiliation of the requesting node. Reasons for filtering may be to authorize access to visiting nodes.

The present invention also constitutes a distributed system for collecting, storing, indexing and searching metadata generated by the nodes participating in the system. A typical application example could involve an MN equipped with GPS functionality. The MN may communicate, during registration and/or at subsequent time intervals, its GPS data to its point of attachment, HR/FR. The point of attachment may store and propagate, possibly after some indexing and processing along with correlated data, the GPS-related metadata or any pre-configured indexes thereof to any other node in the system, typically the MN's HR or DR or any other dedicated set of (metadata) servers. A yet more efficient use may involve metadata indexing in HR/FR, while instead of propagating the metadata as such, only propagate notifications of "metadata indices", thus notifying the associated DR (or DRs, or any other dedicated set of servers, if applicable) that metadata is available and by which type for later querying, would it be needed. Another straightforward metadata application example is to use the overlay's metadata infrastructure to enable MNs (and their owners/users) to search and locate each other for building and maintaining user communities. This may be realized if an MN registers itself with a for example a unique community-specific ID in its point of attachment (HR/FR) and that the system is able to search and locate other users by means of this ID. In that way, the network location, and actual geographic location in case of GPS data being present, of any MN may be determined by other MNs in the system. In further embodiments, those skilled in the art will appreciate that the foregoing applications can be further extended and combined in the present metadata overlay infrastructure. It may typically be convenient to integrate the metadata search and query operations in the aforementioned MN bootstrapping and registration process outlined in connection with FIG. 2 above.

Figure 9:
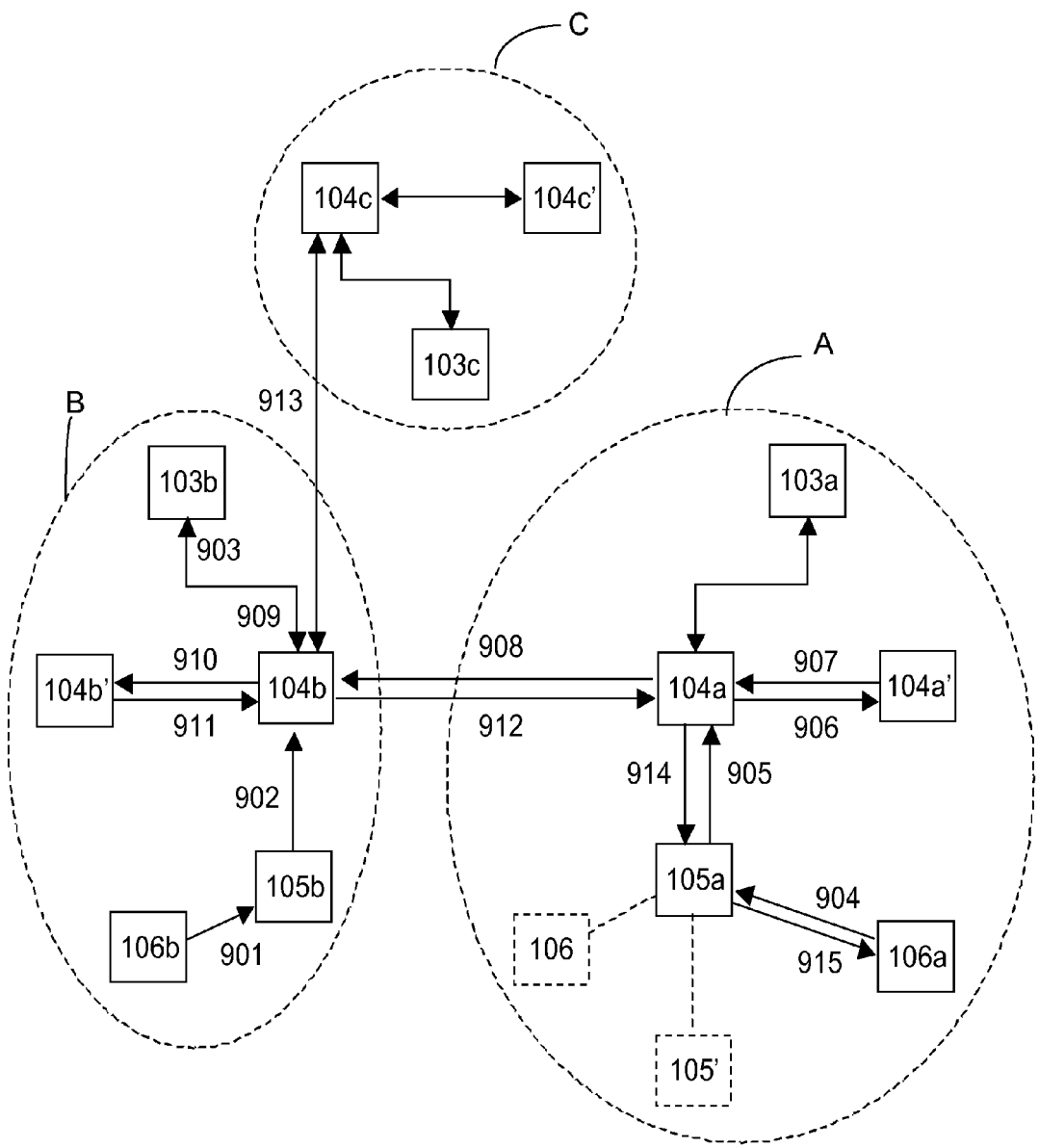
FIG. 9 is a schematic diagram of an embodiment of a method for a metadata query.

An embodiment of a method for a metadata query is illustrated in FIG. 9. In this example, an MN 106*b* has communicated its metadata to its FR 105*b* in step 901, which in turn may be propagated, depending on the filtering rules that apply and possibly after some processing, to the MN's 106*b* HR 104*b* in step 902 and DR 103*b* in step 903, respectively, depending on which indexing policy is used in domain B. The stored metadata information can now be shared with other MNs. In the current example, another MN 106*a* in another domain A issues a metadata query in step 904 for other peers with matching data. The FR 105*a* propagates the query to the querying MN's HR in step 905, which in turn may propagate the query to all HRs 104*a'* under the same DR 103*a* in domain A in step 906, if allowed by the domain policy; this is denoted an intra-domain query. The addresses of all HRs in a domain may be stored and controlled by the domain's DR. Each queried HR in the domain forwards the query to those FRs that has indicated that matching metadata is collected (as described in earlier paragraphs), eventually leading to a reply going back to the originating HR 104*a* in step 907. The query process dictating how and to which FRs the queries are directed may follow any predetermined graph search algorithm for Directed Acyclic Graphs, e.g., Breadth-first search or Depth-first search. The query may also be propagated to HRs in other domains with whom the querying HR 104*a* has a direct peering relationship in step 908, in this example a HR 104*b* in domain B. The peered HR 104*b* in domain B may then ask its DR 103*b* in step 909 if intra-domain forwarding from the originating domain, domain A, is allowed in domain B. If it is allowed, the query is propagated intra-domain in domain B to the other HRs 104b' in step 910. The replies are collected in step 911 and eventually returned to the originating HR 104a in domain A in step 912. Similarly, if so indicated in the original query, a peering HR 104c in another domain may forward the query to its peering HRs 104c' in step 913, thus performing an indirect peering query, in this case towards domain C. If allowed by the DR 103c in domain C, an intra-domain query may be performed in domain C. Search replies are received by FR 105a in step 914 and finally relayed to MN 106a in step 915.

A DR maintains TCP connections, or any other suitable transport layer connections, to each of the HRs in its domain. For redundancy reasons, it may also establish such connections with second to next FRs, based on address information that is propagated from each HR as the network situation changes. Given the conditions in FIG. 10, the DR's 103 routing table is shown in FIG. 11. As can be seen, the primary addresses point at nodes, the FRs 105 and 105x two hops away, using the HRs 104 and 104x as a second option, to be used only if the primary look-up path fails. The redundant paths may span the whole or parts of the look-up chain, from the DR 103, over the intermediate HR/FR nodes 104, 105, 105' and the anchor HR/FR node 105" and, finally, down to the MN 106 node. It may also be possible to let several HR and FR nodes connect to an MN, for redundancy reasons, thus yielding multiple anchor nodes for an MN. Despite the primary/secondary path redundancy strategy employed here, it should be noted that in another embodiment, any number of available alternative paths may be used between any pair of nodes interconnected in a look-up chain leading to a specific MN hosting a specific URI.

Functionality for redundancy and fault recovery reasons, by means of for example a retrial scheme (including, e.g., exponential back-off timers), may be provided to control the transport connections between any two nodes. It should be understood that it is imperative to employ any such repair mechanism for discovering and repairing paths involving unresponsive nodes.

HR and FR nodes may connect to DR, HR, FR and MN nodes using TCP connections, where one TCP connection may be used by many look-up paths (in order to propagate look-up requests). It should be noted that other transport protocols than TCP may be used in alternative embodiments. Each TCP connection is associated with a routing table as the example shown in FIG. 12 referring to FIG. 10. Redundant connections may is used. This is illustrated by two alternatives in each direction in this embodiment. The paths are set up using signaling during MN registration or due to topology changes (e.g., when a node goes down). The timer is renewed, either instantaneously or incrementally, for each look-up event or heartbeat for the MN hosting the URI address; if a timer in a node expires (reaches its configurable limit), the timed out entry may be removed from the table after a sequence of signalling to neighbour nodes. The signalling will start a sequence of routing table events in the neighbour nodes. Typically, the primary and secondary paths (in case two redundant paths are used per URI) are updated to point to other nodes than the timed out node. If necessary, new TCP connections are set up, otherwise the existing TCP connections' routing tables are modified. The direct flag is set if the MN with the URI is directly connected to the node in question, in which case the timer isn't active for this URI. To ensure that a lookup chain does not grow too long, nodes may remove itself from a specific lookup chain if inactivity is detected. A router node is responsible for detecting associations to MNs having low activity. When a node detects an association to an MN to which it hasn't been directly connected for a sufficiently long time (determined by means of timer value, possibly combined with activity measure) it will initiate a removal of itself from the chain. To accomplish this it has to contact all neighboring nodes involved in the lookup process for this MN (i.e., nodes connected via it's primary and secondary link and the nodes with primary or secondary linking to it). The responsibility for rebuilding the network is placed on the remaining router nodes.

Figure 10:
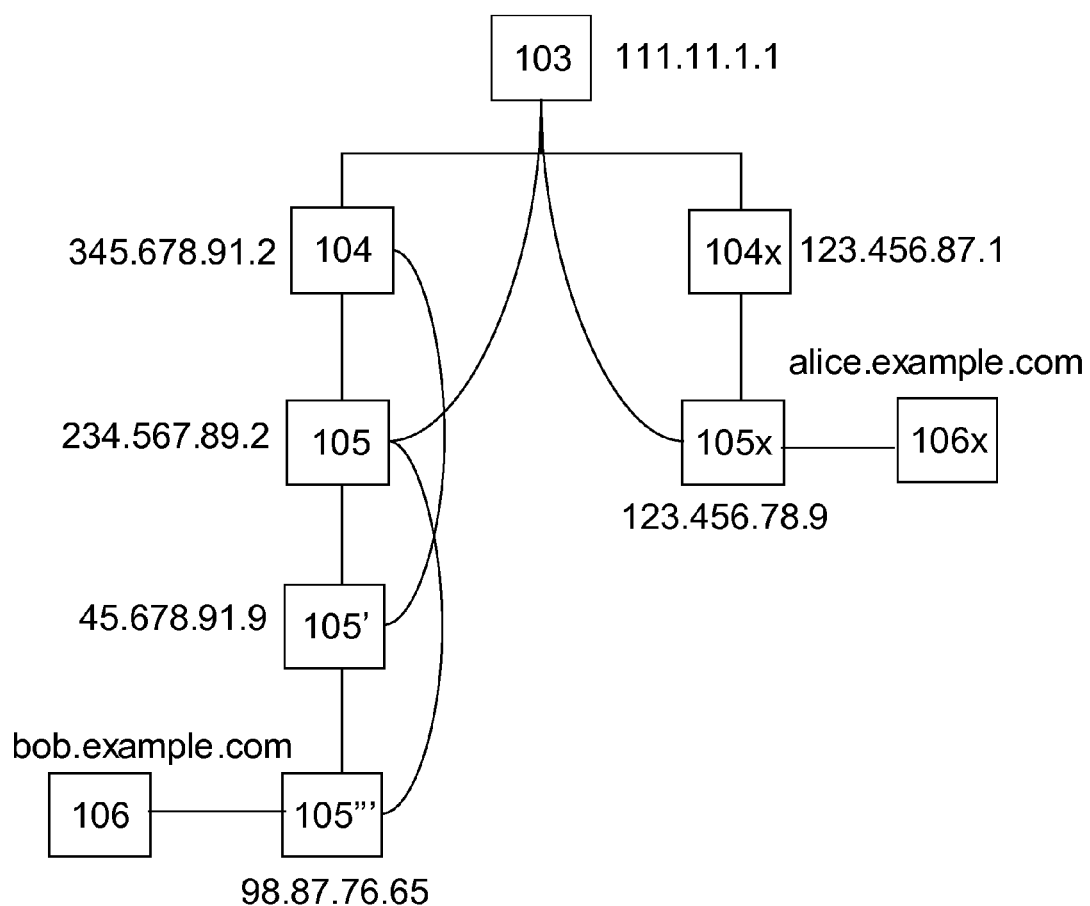
FIG. 10 illustrates an embodiment of an overlay network.
Figure 13:
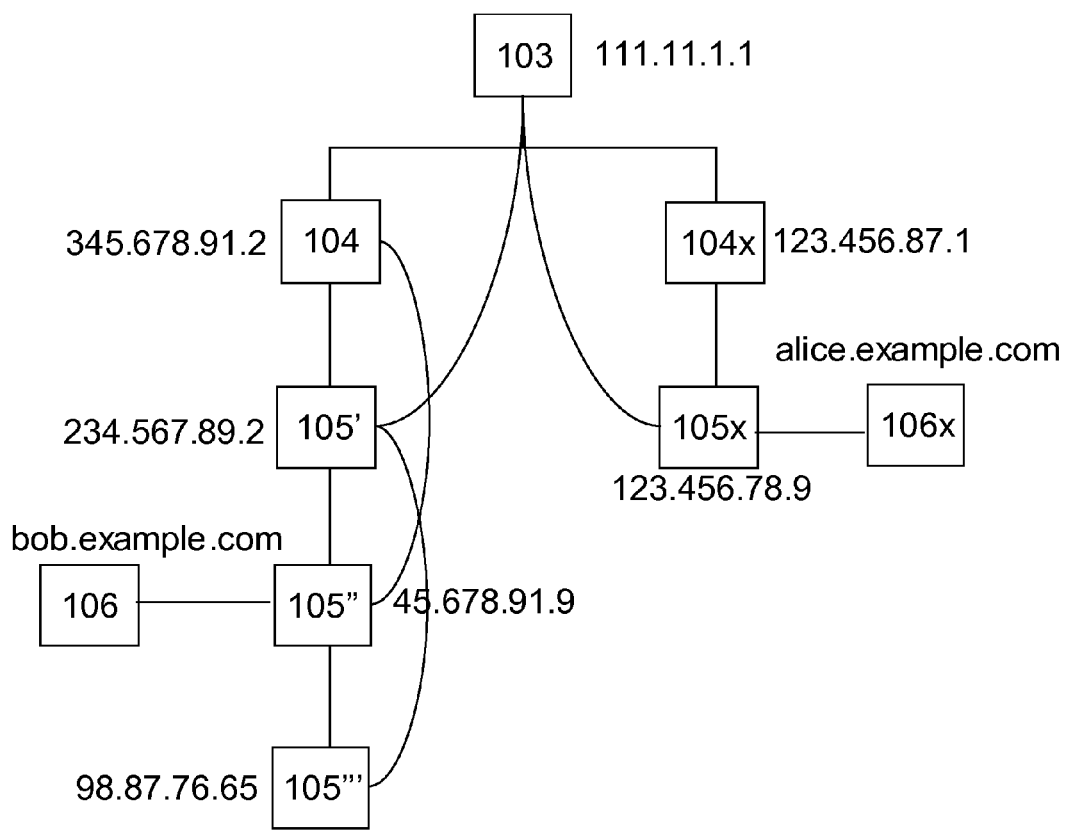
FIG. 13 shows an updated case of FIG. 10 after a move by the MN.

FIG. 13 shows an updated case of FIG. 10 after a move made by bob.example.com's MN 106 to the FR 105' with address 45.678.91.9. FIG. 14 shows the updated routing table of the FR 105 with address 234.567.89.2 after the move. As can be seen, the primary and the secondary addresses have been swapped for the entries concerning the current MN in the FR's routing table. This is the result of path signalling update messages being exchanged in the chain of nodes, as outlined in previous paragraphs and further explained here. Consider an example look-up chain with nodes DR-HR-FR1-FR2, where an MN is directly connected to FR2. The following steps are performed upon MN moving to a new, previously unvisited point of attachment, say, FR3:

Step 1. MN signals FR2 about its move. From this point, FR2 will answer any service request towards MN with a temporary error message until otherwise informed.

Step 2. MN connects to FR3.

Step 3. FR3 sends a message to FR2 informing it of MN's new position.

Step 4. FR2 replies and informs FR3 of the router preceding it (FR1) in the chain.

Step 5. FR3 contacts the router two steps back (FR1) and informs it to create a primary link to it (FR3) while making a secondary link the previous router (FR2). The links of the affected nodes are updated.

If MN connects to a router already in its chain instead of moving to a new, previously unvisited point of attachment, the previous point of attachment node will not change its routing table, nor will the predecessor of the previous point of attachment node (unless the predecessor becomes the new point of attachment). This leaves the chain unaffected of the change in nodes around the previous point of attachment. Instead, the only changes take place in the predecessor node(s) that has the new point of attachment on its secondary next link. After the change, the two nodes preceding the MN's current point of attachment point to the node with their primary links. Therefore we end up on the correct node no matter which of these routers is involved in the lookup, since we try primary links first. If MN makes another move we switch back the routing entries to what they were before this last change, leaving this part of the chain as it was before the move. One main reason to handle moves within the chain like this is to avoid the creation of cycles and to never have more than one primary and secondary path to each router.

When an MN moves from one node, for example node A, to another node, for example node B, not previously part of the look-up chain (sequence of interconnected nodes handling look-ups to the MN), a new branch of the look-up chain will be formed. Node A will be made aware of the move by means of receiving the registration messages from MN via the new anchor node B. Before connecting with the new branch, A ensure that its successor nodes (if any) in the now isolated look-up chain are cut off properly. This cut-off is done by means of sending tear-down messages to those successor nodes. In this example, node A will send a tear-down message to its successor node in the now invalid chain, telling it that the entries for that MN are invalid. A node receiving a tear-down message for a specific URI address, will clear its routing entries (in all directions) for that URI and then forward the tear-down message as it would do with a lookup until it reaches the end of the invalid chain. The rest of the entry is kept in the table until it reaches its time out since MN might connect back, making any stored information useful. Node A will then modify its routing table accordingly, connect with node B, and propagate the path setup message upwards to its predecessor in the look-up path. Moreover, A will also signal B the address of its predecessor(s) for having B to interconnect with them. One valuable side effect of removing invalid chains when they appear is the automatic pruning of the chain. Since most of movements to previously unvisited routers can be expected to happen from routers other than the last one in the chain, this phenomenon should be quite common. As a consequence, if MN returns to a router previously disconnected from the chain using the tear-down process outlined above, the router is incorporated into the chain just as we would do with any previously unvisited router.

It should be noted that in another embodiment, a MN may contain STUNT server functionality, so that any client with STUNT client functionality is able to, if the NAT traversal is successful, establish a direct connection with a MN after a STUNT signalling and traversal process (as an alternative to the HR/FR relay connection). In the present system this would be solved by including a STUNT option in the look-up reply in messages in step 405 and 406 in FIG. 4. Thus, if STUNT option is set, thus indicating that the HR/FR and the MN node are all STUNT capable, and the client is STUNT capable, instead of sending message 7, a STUNT signalling and traversal process is initiated. It should be apparent to one of ordinary skill in the art that other NAT traversal mechanisms and techniques, e.g., those mentioned in the ICE framework, may be used instead or in addition to the aforementioned STUNT solution.

It should be noted that in one embodiment, a MN may maintain one or several active connections with one or several HR/FR nodes simultaneously. Multiple connections may be established and used in parallel for higher total bandwidth capacity. Not all of the established connections may be active, but maintained for redundancy reasons, used as back-up or alternative paths, i.e. both "hot" and "cold" stand-by connections are possible, depending on operational requirements. It is possible, but not necessary, that applications involving a MN use separate connections. It is however also possible for one or several of these applications to transmit across parallel connections, thereby involving multiple HR/FR entities during the data transfer. In this case, application data may be transmitted as redundant, replicated data in parallel, or the data transfer may be divided across parallel connections. Different connections may use different bearer technologies, which are apparent to one of ordinary skill in the art, e.g. WCDMA, HSPA, EDGE, Wimax, WiFi, Ethernet, Bluetooth, USB. Furthermore, the set of connections being maintained between a MN and one or several of its connected FR/HR nodes should allow an application session to transfer and thus handover its data transmission, in a seamless and uninterrupted manner, between different of these connections, possibly under the control of another FR/HR, and possibly on demand, thereby choosing the best bearer and connection at all times, where best may be determined by combinations of various criteria such as cost, reliability, quality of service, bandwidth and capacity, power consumption, location and spatial presence, or other. Such handover schemes may be initiated and controlled by a handover scheme implemented in the MN and the HRs/FRs connected to the MN, e.g. via newly established, as will be elucidated in next paragraph, or already existing connections.

It should be noted that in one embodiment, a MN may connect, either directly or indirectly, with HR/FR nodes present in the same local area network (LAN) and/or with HR/FR nodes within reach for short range communication technologies such as Bluetooth or USB. Such connections could be used stand-alone or in parallel with other bearer technologies mentioned above, allowing for seamless handover from, e.g., 3G to Bluetooth or WLAN, and vice versa. By extending the said overlay networking solution with the described local connectivity capability, it is possible for a user to connect to a locally present MN without utilizing the overlay network infrastructure, forming a personal area network (PAN) between a MN and a locally present FR/HR entity. If such local connection is possible, and in turn the locally present FR/HR module is connected to the overlay infrastructure, a MN may connect to the overlay network infrastructure via the locally present FR/HR entity, which most likely offers a better connectivity solution. In the latter case, the locally connected FR/HR appears to the MN and any requesting client as part of the overlay network. If a locally present client, e.g. a web browser client, resides on a PC containing also a locally present FR/HR, and the client requests content from a locally present MN not previously connected to the locally present FR/HR, seamless handover of the application session is made possible by establishing, on demand, a local connection between the MN and the FR/HR and then directing requests to the FR/HR via a localhost socket. The procedure for accomplishing this is as follows, assuming Bluetooth for the local connection:

1. Discover and establish a connection over Bluetooth by pairing the MN and the local HR/FR.
2. Open a localhost socket and wait for incoming traffic in the MN and the local HR/FR, respectively.
3. The MN orders the current overlay HR/FR to respond to any incoming requests from the client with a redirect response to the localhost socket.
4. The overlay HR/FR returns a redirect to the client PC's localhost socket.
5. The client PC's FR/HR entity passes on the incoming redirected request to the MN via the Bluetooth connection.
6. The MN receives the redirected request, assembles a response and then sends the response to the client PC's FR/HR over the Bluetooth connection.
7. The client PC's FR/HR writes the response to the localhost socket and the handover is completed—the browser has all the web content displayed.

The above is not exhaustive, and where possible, due to availability of information, actions of the procedure may be performed in a different order.

Figure 15:
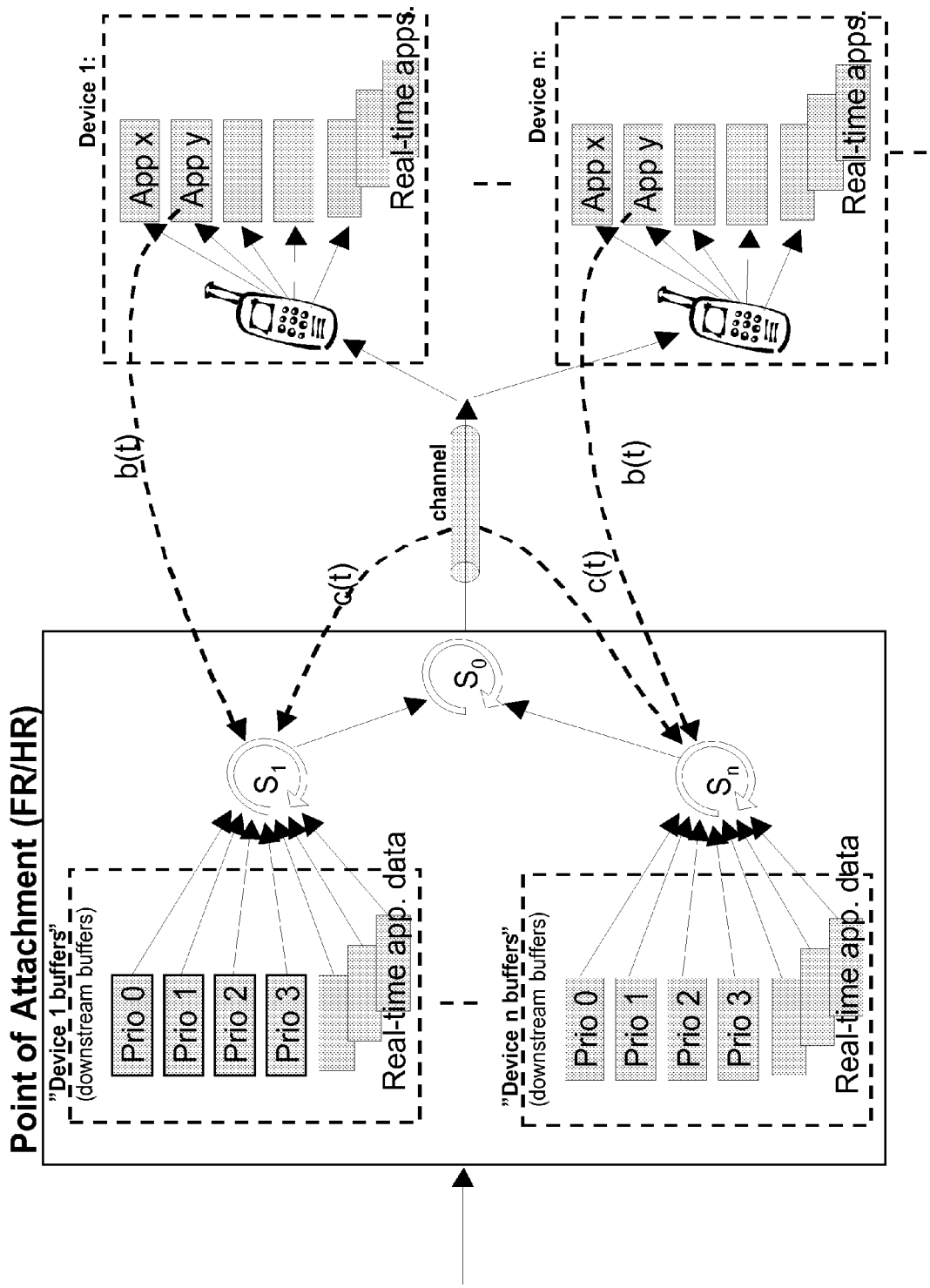
FIG. 15 shows a part of a system for efficient handling and control of the signalling and data messages downstream and upstream between an MN and its current point of attachment according to one embodiment.

FIG. 15 shows a part of a system for efficient handling and control of the signalling and data messages downstream and upstream between a MN and its current point of attachment (realized by HR/FR nodes) according to one embodiment. This method is crucial for handling the possibly scarce resources in the mobile device and the potential low-capacity or error-prone wireless access between an MN and its anchor FR/HR node. Some embodiments contains the following functional elements: pre-processing and proxy functionality, and downstream and upstream traffic management, respectively. The downstream load balancing and traffic management is illustrated in FIG. 15. It is shown how streams of data messages to the MN devices located at the right arrives to the MNs' common point of attachment (an FR or HR) from the left. The FR directs and if necessary temporarily stores the incoming traffic stream in its internal buffer structure. Each MN device is logically represented internally in the anchor node. Within each such device representation, each application running on the device is represented by one or several buffers. A scheduling algorithm structure controls access to the common data transport channel. For proper control, feedback of the current status of channel capacity (c(t)) and application performance (b(t)) is signalled back to the anchor node from each MN device. The schedulers are organized in a hierarchical structure, and data is scheduled out onto the common transport channel (or blocked in case of congestion) according to the current scheduling policy (configurable by the node administrator). A similar structure is necessary also in the upstream direction, where each device controls the flow of data from each application running in the device to the anchor node.

The management of traffic between an MN and its anchor node (HR/FR) also constitutes a pre-processing and processing offloading functionality. This is managed by means of a separate control signalling protocol (assumed to run out-of-band in the present invention, but in-band signalling may also be used) that defines rules and policies with regards to pre-processing in the anchor node on behalf of the device's currently active applications. Typically, the device may signal, according to a well defined control structure, instructions to the anchor node. Such instructions typically instructs the anchor node how and for which application data it should perform data packet inspection and classification, and if and how any pre-processing results should be signalled (typically by writing in an encoded result in the appropriate data field in the packets concerned) to the device. It should be apparent that packet filtering like security and access control functionality may be implemented by this method.

Hence, the method and apparatuses of the embodiments described herein provides a protocol stack for efficient and scalable peer-to-peer model of communication in dynamic and mobile communications networks of devices and computers where nodes form a generic overlay network and may be mobile and move independently of the underlying network infrastructure.

Moreover, the protocol stack according to an embodiment the present invention includes an enhanced network layer protocol allowing for dynamic source routing and to find service hosting peers, e.g., based on proximity, further, a protocol between mobile nodes and the overlay network router nodes for efficient data exchange on the application layer, for optimizing the data exchange and performance of the current applications.

An advantage of the present invention is that it may provide a dynamic and scalable network infrastructure where mobile nodes are always reachable by other peers and are addressable through a generic overlay peer-to-peer network running on top of a mix of both fixed wireline and mobile wireless communication networks.

The method of the present invention is preferably implemented in computer software executable preferably by an electronic apparatus with computer capabilities. In this embodiment of the invention the electronic apparatus comprises a computer apparatus including a computer processor for processing data and storage means connected to the computer processor for storing data on a storage medium, wherein said computer apparatus is configured to execute the steps of the method.

In addition, the invention also extends to programs on or in a carrier, adapted for putting the invention into practice. The program may be in the form of source code, object code a code suitable for use in the implementation of the method according to the invention. The carrier can be any entity or device capable of carrying the program. For example the carrier may be a record medium, computer memory, read-only memory or an electrical carrier signal.

What is claimed is:

1. A method of forming a generic overlay network for efficient information retrieval in a communications network, comprising the steps of:
   receiving in a domain router a register request from a mobile communications apparatus, the register request including an Uniform Resource Identifier (URI) or logical name of said mobile communications apparatus;
   looking-up an address to a next-hop router associated with the URI or logical name;
   sending the register request to the next-hop router;
   receiving a reply from the next-hop router;
   if the reply includes an address to a home router associated with the mobile communications apparatus, sending a reply to the mobile communications apparatus including the address of the home router, said reply initiating the establishment of a connection between the mobile communications apparatus and the home router;
   storing in a table addresses to clients with currently outstanding, non-answered look-up queries for an URI in a domain controlled by the domain router; and
   replying to all clients with currently outstanding queries in response to receiving a first query response for a certain URI from a next-hop home router and/or foreign router.

2. The method according to claim 1, wherein the step looking-up comprising the further step of: identifying the network address of the home router in the communications network.

3. The method according to claim 1, wherein the step looking-up is based on network proximity, or geographical location, or capacity and traffic measurements, or peering collaboration agreements set up based on communities and known interpersonal relationships for the home router.

4. The method according to claim 3, wherein the network proximity is determined based on one or more of a number of hops, ping/trace-route latency, and overlapping routes for the home router.

5. The method according to claim 3, wherein the geographical location is based on GPS data of the mobile communications apparatus.

6. A domain router for forming a generic overlay network for efficient information retrieval in a communications network, comprising:
   a receiver adapted to receive a register request from a mobile communications apparatus, the register request including an Uniform Resource Identifier (URI) or logical name of said mobile communications apparatus;
   a controller adapted to look-up an address to a next-hop router associated with the URI or logical name,
   a transmitter adapted to send the register request to the next-hop router;
   wherein, the receiver is adapted to receive a reply from the next-hop router; the controller is adapted to determine if the reply includes a network address to a home router associated with the mobile communications apparatus;
   the transmitter is adapted to send a reply message to the mobile communications apparatus including the address of the home router, said reply message initiating the establishment of a connection between the mobile communications apparatus and the home router; and
   a table of addresses to clients with currently outstanding, non-answered look-up queries for an URI in a domain controlled by the domain router, and the controller is adapted to, in response to receiving a first query response for a certain URI from a next-hop router and/or foreign router, reply to all clients with currently outstanding queries.

7. The domain router according to claim 6, wherein the network address is a domain name and the domain router is registered as an agent for a set of domain names searchable in the communications network.

8. The domain router according to claim 6, wherein the receiver is adapted to receive a look-up request for a logical identifier from one or more clients, the controller is adapted to look-up a home router or foreign router associated with the logical identifier and to control the transmitter to send the look-up query to the looked-up home router, the receiver is adapted to receive a redirect address of a relay node responsible for handling the request from the looked-up home router, and the transmitter is adapted to reply to the requesting client with the redirect address of the relay node.

9. The domain router according to claim 6, comprising a routing table of addresses to home routers and foreign routers.

10. The domain router according to claim 9, wherein the receiver is adapted to receive registration or update information from one or more home routers and/or foreign routers, and the controller is adapted to store the registration information in the routing table.

11. The domain router according to claim 10, wherein the routing table is adapted to store alternative addresses of home routers and/or foreign routers for one or more logical identifiers.

12. The domain router according to claim 9, wherein the controller is adapted to maintain connections on a transport layer with all routers in the routing table.

13. The domain router according to claim 6, comprising a list of logical identifiers associated with one or more other domain routers, and the controller is adapted to redirect queries for names in the list of logical identifiers to one of the other domains.

14. The domain router according to claim 9, comprising a list of domains that are allowed to send queries generated by home routers to home routers stored in the routing table of the domain router.

15. A method of forming a generic overlay network for efficient information retrieval in a communications network, comprising the steps of:
- requesting by a mobile communication apparatus a connection to a home router by sending an inquiry to a domain name server;
- receiving an address to a domain router connected to the home router; requesting to register at the home router by sending from the mobile communications apparatus a register request including an Uniform Resource Identifier (URI) or logical name of the mobile communications apparatus to the domain router of the received address for looking-up a home-router address associated with the URI or logical name, wherein the home-router address is an address of the home router to which the mobile communications apparatus may be registered;
- receiving a register reply from the domain router with reference to the home router, wherein the reference is the address of the home router to which the mobile communications apparatus may be registered;
- generating and sending a register request directly to the home router; and establishing a connection between the home router and the mobile communications apparatus;
- storing in a table addresses to clients with currently outstanding, non-answered look-up queries for an URI in a domain controlled by the domain router; and
- replying to all clients with currently outstanding queries in response to receiving a first query response for a certain URI from a next-hop home router and/or foreign router.

* * * * *